United States Patent [19]

Kumaki et al.

[11] 4,111,486
[45] Sep. 5, 1978

[54] METHOD AND SYSTEM FOR PERFORMING ATTITUDE CONTROL OF TUNNEL EXCAVATING SHIELD

[75] Inventors: Yoshihiro Kumaki, Urawa; Junpei Kawade, Ichikawa; Toshiaki Takano, Tokyo; Mitsuo Inoue, Chiba, all of Japan

[73] Assignee: Tekken Construction Co. Ltd., Tokyo, Japan

[21] Appl. No.: 791,245

[22] Filed: Apr. 27, 1977

[51] Int. Cl.² ............................................. E21D 9/08
[52] U.S. Cl. ............................................. 299/1; 175/61
[58] Field of Search ............................... 299/1; 175/61

[56] References Cited

U.S. PATENT DOCUMENTS

| | | | |
|---|---|---|---|
| 3,560,753 | 2/1971 | Beug et al. | 299/1 X |
| 3,857,449 | 12/1974 | Kimura | 299/1 X |
| 3,986,568 | 10/1976 | Weiss | 175/61 X |

*Primary Examiner*—Ernest R. Purser
*Attorney, Agent, or Firm*—Burns, Doane, Swecker & Mathis

[57] ABSTRACT

Attitude controlling method of tunneling machine shield and system for performing the method, wherein a plurality of jacks installed at a tail end of the shield for propelling the same toward tunnel face ground are selectively driven when the shield deviates from intended tunneling direction. Such deviation detected is first indicated in an indicating and controlling unit and then the unit is operated to actuate an associated circuit connected to the respective jacks in accordance with the indicated deviation so that selective ones only of the jacks effective to correct the deviation will be driven.

13 Claims, 10 Drawing Figures

METHOD AND SYSTEM FOR PERFORMING ATTITUDE CONTROL OF TUNNEL EXCAVATING SHIELD

BACKGROUND OF THE INVENTION

This invention relates to methods and systems for performing attitude control of a tunneling machine shield and, more particularly, to improvements in the attitude control method of the tunneling machine shield for accurately excavating tunnels through ground layers in an intended excavating direction and in the system for performing the method.

In tunnel excavations employing the tunneling machine shield, a cylindrical shield made of a steel is advanced by means of many propelling jacks substantially peripherally abutting against a rear end of the shield so that the shield will be urged against the ground toward which a forward head part of the shield is facing. An excavated tunnel wall surface exposed right behind the shield consequent to such advance of the shield is retained by a retaining wall member or segments installed so as to overlap internally the rear end of the shield, by repetition of which steps a tunnel is made in the ground.

In such shield tunnel excavations of the kind referred to, it has been required to maintain the shield accurately in axial alignment with the intended excavating direction of the tunnel during the propulsion of the shield so as not to cause any positional deviation from the direction. In order to achieve this purpose, such light beam irradiation means as a laser or the like is installed in the tunnel already excavated behind the shield. A positional deviation detecting means for receiving a light beam from the light irradiation means and detecting any deviated amount of an actually received position of the beam from the central "zero" position of the detecting means is provided in the shield and includes a gyroscope. In the case when there occurs a certain amount of the positional deviation from the intended excavating direction, the detecting means or the gyroscope detects the deviated amount and generates a positional output signal corresponding to the amount, which signal is provided to an attitude controlling means for the shield. In the controlling means, the positional output signal is processed in a manner known per se and a deviated direction and deviated amount are indicated through a servomechanism. In accordance with thus indicated deviated direction and amount, the propelling jacks for the shield are selectively driven so as to correct such direction and amount and thereby the attitude of the shield is corrected.

In this case, it is desirable that the attitude control operation is performed within a short period and in a simple manner since, unless the shield's attitude control is rapidly established, the deviated amount is to be increased and consequently a weaving distance of the shield propelled is caused to be larger. Further, it has been found that a proper propulsion force given to the shield depending on the nature of ground formations would result in an effective attitude control.

SUMMARY OF THE INVENTION

Accordingly a primary object of the present invention is to provide a method and system of effectively performing the attitude control of the tunneling shield for axially aligning the same with the intended or predetermined tunneling direction.

Another object of the present invention is to provide a method and system of performing the shield's attitude control within a shorter period and in a simpler manner.

A further object of the present invention is to provide a method and system of performing the shield's attitude control wherein a control means is provided with a control unit comprising a stationary disk having conductors and a rotary disk having conductors which selectively contact with the conductors of the stationary disk so that many shield propelling jacks will be partly selectively driven for the purpose of removing any positional deviation of the shield from the tunneling direction.

Yet another object of the present invention is to provide a method and system of performing the shield's attitude control wherein a control unit in which conductors of a rotary disk that selectively contact with conductors of a stationary disk are arranged so as to effectively selectively drive shield propelling jacks depending on the nature of ground formations.

Yet further object of the present invention is to provide a method and system of performing the shield's attitude control according to which any deviated direction and amount of the shield from the intended excavating direction can be indicated in a control station remote from actual excavating zone and a plurality of shield propelling jacks can be selectively operated from the station for correctively propelling the shield.

BRIEF DESCRIPTION OF THE DRAWINGS

Other objects and advantages of the present invention shall be made clear upon following disclosures of the invention advance with reference to certain preferred embodiments shown in accompanying drawings, in which.

DETAILED DESCRIPTION OF PREFERRED EMBODIMENTS

Figure 1:
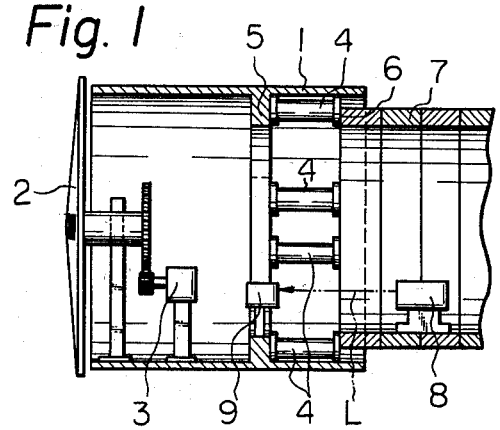
FIG. 1 is a schematic sectioned view of an embodiment of the device according to the present invention for performing the shield's attitude control.

While the present invention shall now be explained with reference to such preferred embodiments as shown in the drawings, it should be understood that the invention is not to limit the present invention to the embodiments shown but rather to include all modifications, alterations and equivalent arrangements in the coverage of the scope of appended claims.

Referring to FIG. 1 schematically showing a mechanism of the attitude control of a tunneling machine shield, the mechanism shall be explained briefly. It appears the mechanism will not require detailed explanations since for the mechanism itself there have been suggested various types which have been made well known such as, for example, the one disclosed in Japanese Patent Publication No. 18471/1972. In that patent there is disclosed a shield 1 to be propelled into the ground which comprises a cutter head 2 axially rotatably mounted to a forward end of a substantially cylindrical body so as to be driven by a motor 3 installed in the body. A plurality of shield propelling jacks 4 which may comprise, for example, 25 pieces in the present instance are installed along an inside periphery of the shield 1. These jacks 4 are disposed between an inner ring-shaped flange 5 provided adjacent a tail end of the shield 1 and a forward end edge 6 of a retention member 7, the latter comprising a plurality of sets of segments for retaining a peripheral wall of excavated tunnel behind the shield 1. The jacks 4 are actuated by means of pressurized oil or the like for propelling the shield toward the tunnel face. Inside the retention member 7, there is installed a laser beam irradiating means 8 so as to irradiate a laser beam L toward a deviation detecting means 9 installed in the shield 1 for receiving the beam L and detecting any deviation of the received beam. In the event that the shield 1 deviates from a predetermined course for the tunneling, the detecting means 9 detects the deviated amount to selectively actuate some of the jacks 4, whereby the shield's attitude will be controlled so that the central axis of the shield 1 will be always brought into parallel relation to the irradiated laser beam.

Figure 3:
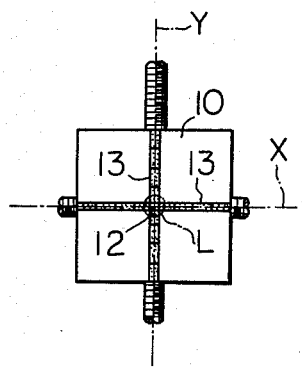
FIG. 3 is a fragmental plan view of a first light receiver in the means shown in FIG. 2.
Figure 2:
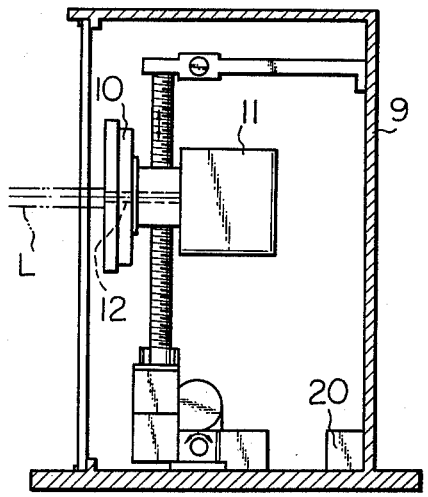
FIG. 2 is a schematic view in vertical section of a deviation detecting means employed in the system according to the present invention.
Figure 4:
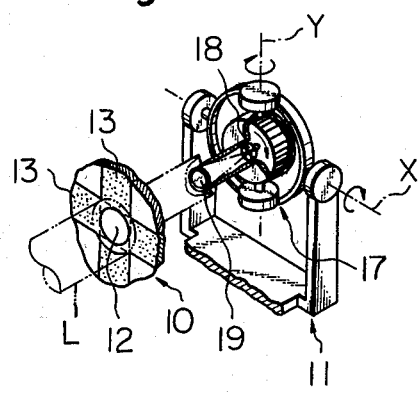
FIG. 4 is a fragmental perspective view showing light receiving mechanism of the first light receiver in relation to an associated second light receiver in the means of FIG. 2.

Referring more in detail to the deviation detecting mechanism of the shield 1 with reference to FIGS. 2 through 4, the detecting means 9 comprises a first beam receiver 10 and a second beam receiver 11. The first receiver 10 has a through hole 12 at the center and a plurality of silicon photoelectric elements 13 arranged crosswise on the respective horizontal and vertical axes X and Y, as seen in FIG. 3, and the receiver 10 is made controllably movable as a whole along the axes X and Y inside the detecting means 9.

Figure 5:
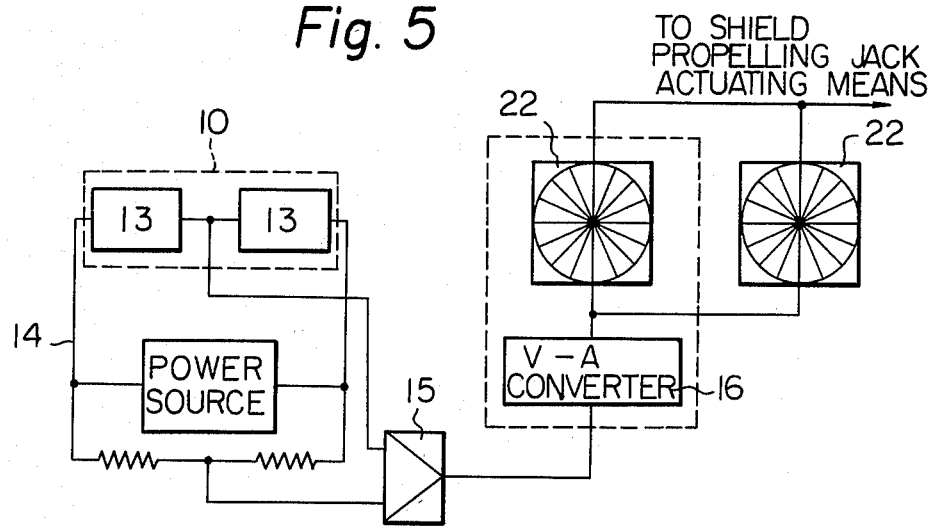
FIG. 5 is a block diagram showing an example of the shield'deviation detecting mechanism employed in the system of the present invention.

Assume that the laser beam L from the beam irradiating means 8 is irradiated on one of the silicon photoelectric elements 13 (as deviated from the central hole 12) on, for example, a lateral side along the axis X. This particular element 13 together with another such element located at a symmetrical position with respect to the central hole 12, form a pair of variable resistors in a Whitstone bridge 14 of the detecting mechanism as shown in the block diagram of FIG. 5. The above noted deviation causes the bridge 14 to become unbalanced, whereby a voltage corresponding to a deviation amount is generated. This generated voltage indicative of the deviation amount of the shield 1 is amplified by a voltage amplifier 15 and delivered through a voltage-ampere converter 16 to a later described X-Y recorder as an X-axis input thereof. The photoelectric elements 13 arranged along the axis Y are also connected in a bridge similar to the above described Whitstone bridge so that, when the irradiating position of the laser beam L is deviated vertically along the axis Y from the central hole 12, as will be readily understood, a voltage representing a deviation amount along the axis Y will be generated and the X-Y recorder will receive a Y-axis input resulting from the voltage.

The second beam receiver 11 provides detections of the deviations in pitching and directional angles. As seen in FIG. 4, the receiver 11 comprises a gyroscope 17 having a photo-senser 18 of quartered circular elements disposed at the center and a lens 19 which focuses the irradiated laser beam L through the central hole 12 of the first beam receiver 10 substantially on the center of the photo-senser 18. Thus, when the shield 1 involves no deviation, the beam L focused substantially on the center of the photo-senser 18 and generates no deviation signal. However, the beam L irradiated through the hole 12 but slightly deviated from the center of the hole 12 and focused on any one of the quartered circle elements of the photo-senser 18 due to a deviation of the shield in a pitching or directional angle will cause a detection signal corresponding to an amount of such deviation to be generated. In addition, it is preferable that the detecting means 9 includes a precise gradienter 20 such as an accelerometer so that any rolling angular deviation of the shield will be thereby detected.

Figure 6:
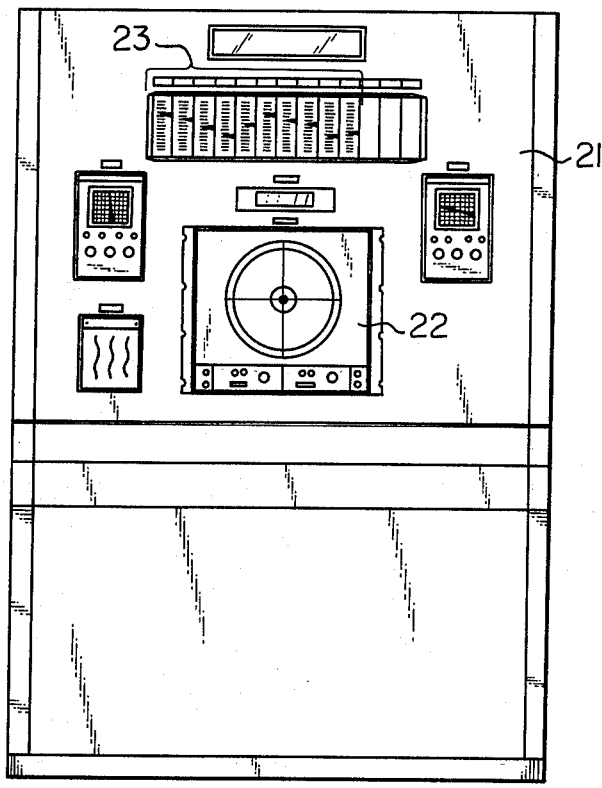
FIG. 6 is a front elevation of a central supervising console used in the system of the present invention.

According to the present invention, such deviations in horizontal and vertical directions and pitching, rolling and directional angles detected as in the aforedescribed manner are visibly represented by an indicator 22 known per se and installed in the shield 1 and are individually indicated by means of such an indicating unit 22 as the X-Y recorder of high sensitivity and a set of indicators 23 assembled in a central supervising console 21 for the attitude control as schematically shown in FIG. 6.

The respective indications of the various deviations are also presented to a data processing device to be recorded so that recorded data may be utilized as technical information for next tunnel excavation.

Figure 7:
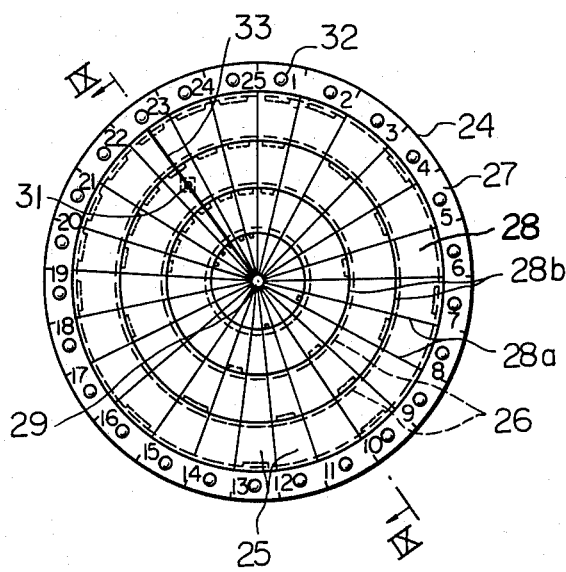
FIG. 7 is a plan view of an embodiment of indicating unit in the system of the present invention.
Figure 8:
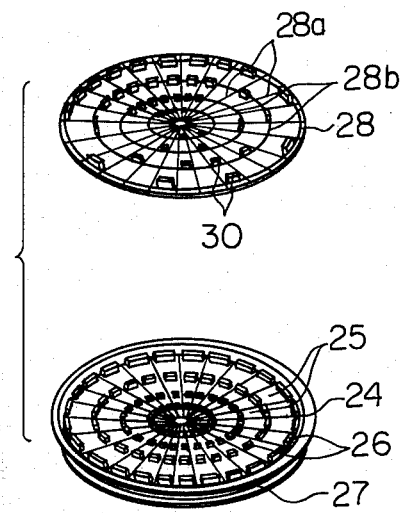
FIG. 8 is a perspective view as disassembled of the indicating unit of FIG. 7.
Figure 9:
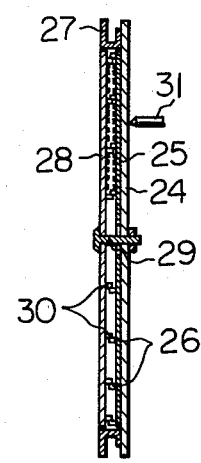
FIG. 9 is a sectioned view on line IX—IX in FIG. 7 of the indicating unit.

According to an aspect of the present invention, the indicating unit 22 is adapted also to perform functions at a control console for selectively controlling a part of the shield propelling jacks 4. Referring to FIGS. 7 through 9, the indicating unit 22 is provided with an indicator 24 which is fixed to a frame of the central supervising console 21. On this indicator 24, there are arranged a plurality of fitting plates 25 each of similar of a sector shape similar to each other so as to form an integral disk as a whole and thus to respectively expand radially from the center of the disk. The plates 25 correspond in number to the shield propelling jacks 4. On each of the fitting plates 25, a plurality of conductors 26 (which comprise four in the illustrated case) are fixed to the plate as equally spaced in the radial direction to slightly project out of the surface of the plate so that, when the sector plates 25 are assembled into the disk shape, the conductors 26 on the respective plates 25 will be aligned to form four concentric ring-shaped arrays, while the four conductors 26 on each plate 25 are connected to each other by means of a line conductor preferably printed adjacent a boundary edge with respect to an adjacent plate 25 and connected to an electric circuit known per se for driving the respective shield propelling jacks 4.

As seen in FIG. 9, the indicator 24 is provided with a ring frame 27 of substantially U shape in section and secured to an outer peripheral part of the indicator 24 to surround the respective sector plates 25 forming the disk on the indicator. A rotary disk 28 is mounted to the indicator 24 rotatably about a pivot shaft 29 secured thereto concentrically with the disk forming sector plates 25. In the rotary disk 28, there are provided radial lines 28a defining the same number of sectors as the sector plates 25 and thus as the shield propelling jacks 4 and further circular lines 28b aligning respectively with the four ring-shaped arrays of the conductors 26 on the plates 25. Further, on a surface of the disk 28 facing the disk forming plates 25, the rotary disk 28 is provided with selective conduction elements 30 which are capable of contacting with selective ones of the conductors 26 on the plates 25 for the selective driving of the jacks 4 in order to achieve an optimum attitude control power responsive to the deviation of the shield. More particularly the selective conduction elements 30 are disposed sequentially along the four circular lines 28b so as to be dense on one side of the center and intermittently so as to be sparse on the other side so that the jacks 4 disposed on the side toward which the shield is deviated with its axial line from the intended tunneling direction will be substantially all driven whereas only certain ones of the jacks 4 on the other side enough for propelling the shield will be driven while allowing the shield to be returned to the side of the intended direction, whereby the shield's deviation will be relatively gradually and slowly corrected. It is preferable that the selective conduction elements 30 on the dense side are sequentially increased in number from the innermost circular line 28b to the outermost line 28b so that a larger attitude control power will be obtained with respect to a larger deviation.

Further, the selective conduction elements 30 disposed at positions in alignment with each of the circular lines 28b are connected to each other by means of, for example, a printed line conductor preferably along or adjacent the circular line 28b as shown by dotted lines in FIG. 7. While not shown in the drawings, four lead wires of the respective line conductors are connected through switches to an electric circuit for driving the jacks 4.

In the illustrated embodiment, the indicator 24 including the sector plates 25 thereon and the rotary disk 28 are made of transparent material of, for example, plastic or the like so that the operator of the console may have a view behind the indicator 24 through the disk 28 and plates 25. Thus, a needle-like deviation pointer 31 of the X-Y recorder is disposed behind the indicator 24 shiftably along the surface of the indicator 24. Thus, the pointer 31 will indicate the direction and amount of the deviation of the shield being propelled in response to the inputs to the X-Y recorder when the laser beam L irradiated from the beam irradiating means 8 in the already excavated tunnel is deviated from the through hole 12 of the beam receiver 10 in the shield 1 so as to be incident on any one of the photoelectric elements 13. Therefore, the signals indicative of the deviation direction and amount are provided from the Whitstone bridge 14. It will be readily appreciated that, in this case, the farther the pointing position of the pointer 31 from the center in any radial direction of the indicator 24, the larger the deviation amount of the shield.

In the ring frame 27 of the indicator 24, there are preferably provided indicating lamps 32 respectively inserted between the conductors 26 of each sector plate 25 and the jack driving electric circuit so that the jacks being driven will be indicated by the lamps 32. Further, the rotary disk 28 has an indexing line 33 preferably at the central radial line position of the area in which the selective conduction elements 30 of the disk 28 are densely provided so that the relative position of the rotary disk 28 to the pointer 31 may be easily recognized.

Figure 10:
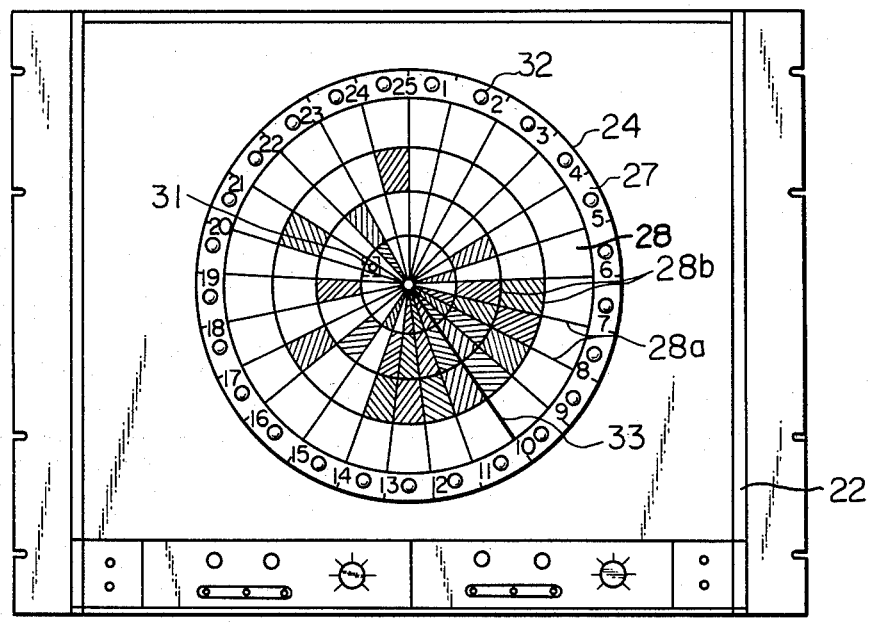
FIG. 10 is a plan view of another embodiment of the indicating unit of the present invention.

According to another aspect of the present invention, there is prepared another type of the rotary disk 28, in which the selective conduction elements 30 are arranged to provide an effective driving of the shield propelling jacks to smoothly remove the shield's deviation in pursuance of the nature of the ground formations or conditions therein through which the tunnel is to be excavated. Referring to FIG. 10, there is provided in the rotary disk 28 a pattern as illustrated by hatchings, preferably by means of a transparent color application in practice, in selected areas defined by the radial and circular lines 28a and 28b. This pattern is drawn on the basis of information attained during previous tunnel excavations and is indicative of positions of the shield propelling jacks 4 where the jacks are required to be driven for optimum propulsion of the shield in response to existing variations in the nature or condition of the ground formations at the tunnel face in its expanding plane which the cutter head 2 of the shield is facing. In this case, it should be readily appreciated that the selective conduction elements 30 are disposed on the rotary disk 28 according to the above pattern.

The operation of the attitude control according to the present invention shall now be explained briefly.

It will be readily understood that, while the shield is normally advancing in the intended tunneling direction without involving any deviation therefrom, the shield propelling jacks 4 disposed substantially at all radial positions or equally distributed positions with respect to the axial line of the shield are substantially uniformly driven in a known manner per se in order to provide a desired propelling force acting in the intended direction to the shield.

When a deviation is caused to occur in the advancing course of the shield 1 and the deviation indicating inputs are provided to the X-Y recorder in the manner described in the foregoing, the deviation pointer 31 behind the indicating unit 22 shifts depending on the direction and amount of the deviation of the shield. Then, the rotary disk 28 is rotated by the operator so that the indexing line 33 will lie above the position to which the pointer 31 points. For instance, when the pointer 31 is shifted to an area inside the innermost circular line 28b as shown, for example, in FIG. 10, one of the switches which is inserted between the lead wire of the selective conductors 30 of the innermost array and the jack driving electric circuit is turned ON to drive the jacks 4 corresponding to such conduction elements 30 of the innermost array only.

In the illustrated case of FIG. 10, the rotary disk 28 will be rotated from the position of the indexing line 33 shown to a position where the line 33 will align with one of the radial lines 28a which is between the lamps 32 numbered "21" and "22" and is the closest to the pointed position by the pointer 31. Then the conductors 26 disposed along the innermost circular line 28b of the sector plates at positions corresponding to the lamps numbered "1", "9", "17" and "19" through "24" will be conducted and the jacks 4 corresponding to these conductors 26 are thereby driven so that the deviation of the shield 1 will be optimumly removed, that is, until the pointer 31 will return to the center position in the indicator 24. At this time, the indicating lamps 32 corresponding to the sector plates 25 of which the conductors 26 are conducted are lighted to show to the operator the particular jacks 4 being driven. Thus, the operator will be able to read on the indicator unit 22 and indicators 23 any occurrence of the shield's deviation amount with its attitude in the vertical and horizontal directions and rolling, pitching and directional angles, as well as the removal process of the deviation.

According to a further aspect of the present invention, the respective indicator unit and indicators are installed in the shield 1 or at a position close to the shield and, in addition, the similar indicators with the data processing means and others are installed at a site remote from the shield or, in particular, in a control station on the ground surface.

In this manner, the tunnel excavation can be performed while supervising the shield's attitude in such remote control station.

What is claimed is:

1. A method of controlling the attitude of a tunneling machine, said machine being of the type including a movable shield and a plurality of power members for moving said shield, said method comprising the steps of:
   irradiating a light beam from a stationary position in a direction substantially parallel to the intended direction of tunneling;
   detecting said light beam at a location on said machine to detect deviations of the direction of shield travel relative to said light beam and generating signals corresponding to the deviation detected;
   visibly indicating the deviation position in response to said generated signals;
   providing a control member connected to actuating means for said power members and which actuates a portion of said power members in accordance with the orientation of a preselected non-uniform pattern of energy transmitting means carried by said control member;
   moving said control member to align a referencing index thereon with said visibly indicated deviation position and thereby reorient said non-uniform pattern of energy transmitting means to determine which of said power members are actuated.

2. A method according to claim 1, wherein said energy transmitting means comprise electrical contacts, said step of moving said control member includes rotating said control member to bring said contacts into electrical contact with selective conductors in an electrical circuit which operates said actuating means for said power members.

3. A method according to claim 1, wherein said step of providing a control member includes providing a control member having a non-uniform pattern of energy transmitting means in which the energy transmitting means are dense in the area thereof containing said referencing index and sparse in other areas thereof, so that more power members are actuated on a side of the shield axis toward which the deviation occurs, than on an opposite side thereof.

4. A method according to claim 3, wherein the jacks are selected so as to be adapted to the nature of the ground formations at the tunnel face.

5. A method according to claim 1, wherein said steps of visibly indicating, providing a control member, and moving said control member are performed at a control station remote from said shield.

6. A method according to claim 1, wherein said light beam is irradiated directed onto said detecting means.

7. An attitude control system for a tunneling machine shield comprising in combination a shield deviation detecting means installed in said excavator for detecting any deviation of a light beam irradiated from a stationary position normally parallel to a longitudinal axis of the shield and received by said detecting means and for generating signals corresponding to detected deviation, means receiving said signals for visibly indicating such deviation, and means for selectively closing an electric circuit connected to an actuating means for a plurality of shield propelling jacks, said circuit closing means comprises a stationary member having a plurality of conductors connected to said actuating means such that each conductor operates one of said shield propelling jacks and a rotary member rotatable with respect to said stationary member and having a plurality of contact elements contactable only with selective ones of said conductors of the stationary member so that effective ones of said jacks will be selectively driven in accordance with said signals, for correcting the deviation.

8. An attitude control system for a tunneling machine which includes a movable shield and a plurality of power members for moving said shield, said control system comprising:
   means for irradiating a light beam from a stationary position in a direction substantially parallel to the intended direction of tunneling;
   detecting means in said machine for detecing deviations of the direction of shield travel relative to said light beam and for generating a signal corresponding to a deviation detected; control means connected to said detecting means and to means for actuating said power members for actuating selected ones of said power members in response to said generated signals to correct the direction of travel of said shield, said control means comprising:
   means for visibly indicating the deviation position in response to said generated signal,
   means for closing an electric circuit connected to the power member actuating means for actuating said selected power members, said circuit closing means including a plurality of circuit-closing contacts arranged in a preselected non-uniform pattern for determining which of the power members are to be actuated, said circuit closing means being movable and including a referencing index so that movement of said circuit closing means to align said referencing index with the visibly indicated deviation position reorients said non-uniform contact pattern and determines which of said power members are actuated.

9. A system according to claim 8, wherein:
   said control means comprises a stationary member, said circuitry including a plurality of conductors on said stationary member and connected to said actuating means for said power members so that each such conductor controls the operation of one of said power members, said control means further comprising a rotary member carrying said circuit closing contacts and said referencing index, said circuit closing contacts being electrically connectable with a selected plurality of said conductors for closing the circuitry connected to such conductors and thereby operating the associated power members.

10. A system according to claim 9, wherein said conductors are arranged in a ring, said contacts being densely arranged in an area of said rotary member containing said referencing index and sparsely in other areas so that more of said power members are actuated on the side of said shield toward which the shield is deviated than on an opposite side.

11. A system according to claim 9, wherein said contacts are positioned so that said power members are driven in accordance with the nature of ground formations at the tunnel face.

12. A system according to claim 9, wherein said stationary and rotary members are formed of transparent material so that said indicating means is visible therethrough.

13. A system according to claim 8, wherein said irradiating means is aimed directed toward said detecting means.

* * * * *